Oct. 14, 1958
G. CARLSON
2,856,592
EXTENSION WIRING SYSTEM
Filed May 1, 1956
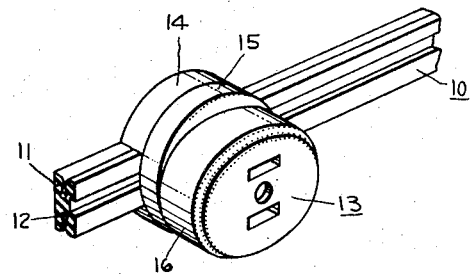
Fig. 1.
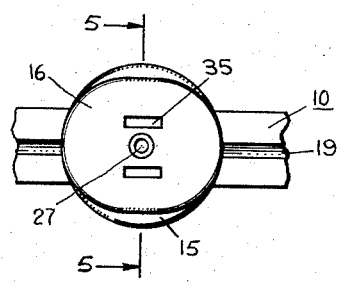
Fig. 2.
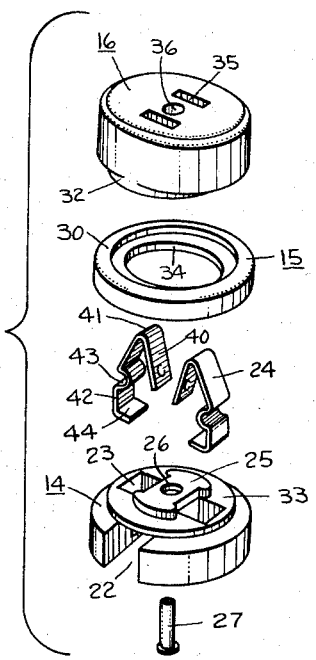
Fig. 3.
Fig. 4.　　Fig. 5.　　Fig. 6.
Fig. 7.　　Fig. 8.
Inventor:
George Carlson
by Richard L Caslin
His Attorney.

United States Patent Office 2,856,592
Patented Oct. 14, 1958

2,856,592

EXTENSION WIRING SYSTEM

George Carlson, Trumbull, Conn., assignor to General Electric Company, a corporation of New York Application May 1, 1956, Serial No. 581,961

4 Claims. (Cl. 339—21)

This invention relates to an electrical wiring system for home or office use and particularly to an improved form of outlet which may be clamped anywhere along the length of a special electrical cable that is fastened to the wall near the baseboard.

The present invention comprises a two-conductor cable of resilient insulating material having a conductor arranged in a groove in the opposite side walls thereof and a novel outlet which may be clamped on the cable at any place along the length thereof so that an electric lamp, appliance, tool or machine may be plugged into a wall-supported outlet without the use of a long dangling extension cord. A special connection which does not form part of this invention would have to be made between an existing outlet and the special cable of my invention by replacing the usual convenience outlet with a suitable terminal block connecting with the end of the cable and having a faceplate thereover. The cable would be strung along the top of the baseboard running around the floor of the room and several outlets would be available for clamping anywhere along the length of the cable. There are many patents in the prior art showing continuous outlets but in most, if not all, of them it was necessary to insert the outlet onto the end of the cable and slide it along the cable until it reached the proper location. A primary advantage of the present invention is that the outlet may be attached to the cable by a simple clamping action at the desired location.

The plug-in outlet of my invention comprises a recessed base and a recessed cap that is fastened to the base. The bottom wall of the base has a slotted opening diagonally arranged therein so that the base may straddle the cable. A pair of electrical contacts are arranged in the outlet with a pair of attachment plug prong-receiving openings in the cap in alignment with the contacts. The contacts are made of resilient strip material generally of hairpin shape. There is sandwiched between the base and cap a manually adjustable ring member having an internal cam surface in engagement with the terminal ends of the contacts. The outlet is attached to the cable by first placing the outlet over the cable and then turning the ring member until the terminal ends of the contacts are pressed inwardly toward each other and into engagement with the parallel conductors of the cable. A reverse operation is necessary in order to remove the outlet from the cable.

Accordingly, the principal object of this invention is to provide an extension wiring system with a novel combination of cable and outlet where the outlet may be clamped onto the cable at any point along the length thereof.

A further object of this invention is to provide an improved extension wiring system including a special cable having a conductor arranged in a groove in the opposite side walls thereof and a novel plug-in outlet which may be electrically connected to the cable by simply turning an adjustable ring member which clamps the outlet to the cable.

A further object of this invention is to provide a special extension wiring cable with a novel outlet which may be attached at any point along the length of the cable for receiving a standard attachment plug.

My invention will be better understood from the following description taken in connection with the accompanying drawing and its scope will be pointed out in the appended claims.

Figure 1 is an isometric view of a short length of cable having supported thereon a plug-in outlet embodying my invention.

Figure 2 is a top plan view of the outlet of Figure 1.

Figure 3 is an exploded view of the outlet embodying my invention.

Figure 4 is an end view of the outlet and cable shown in Figure 2.

Figure 5 is a cross-sectional elevational view taken on the line 5—5 of Figure 2 with the outlet simply placed over the cable.

Figure 6 is a cross-sectional view similar to that of Figure 5 except that the adjustable ring has been turned to force the terminal ends of the contacts into engagement with the conductors of the cable.

Figure 7 is an enlarged cross-sectional view of the preferred type of cable used in this invention.

Figure 8 is a plan view of the adjustable ring member showing the oval shape of the internal cam surface.

Referring in detail to the drawing, and in particular to Figure 1, 10 represents a non-metallic sheathed cable having an extruded rubber or vinyl insulation 11 and a pair of current-carrying conductors 12. Fastened over the cable 10 is a plug-in convenience outlet 13 comprising a base 14, an adjustable ring member 15 and a cap 16, as will be better understood with reference to Figure 3. An enlarged cross-sectional view of the cable 10 is shown in Figure 7 where each conductor 12 is located in a groove 17 in the opposite sides of the insulation 11. These conductors may be assembled with the insulation during the extrusion thereof or they may be assembled after the insulation has been extruded by snapping the conductors into place. Although the conductors are securely held in the insulation, they are accessible from the outside since the grooves 17 have beveled surfaces 18 at their outer edges to facilitate the entrance of the terminal ends of the outlet contacts into engagement with the cable conductors. These grooves are preferably closed to avoid accidental contact with the conductors. The top of the cable has a shallow groove 19 to assist the electrician in positioning nails or screws used to fasten the cable to a supporting wall structure A further wiring aid would be to provide pin holes (not shown) for the nails or screws at short intervals along the length of the enclosure. These pin holes would not remove any of the insulation from between the parallel conductors but would merely represent a separation in the insulation and indicate to the electrician where the nail or screw is to be placed.

Now turning to a consideration of the detailed exploded view of Figure 3, it is seen that the base 14 is circular in plan view and provided with a diagonal slot 22 in its bottom portion so that the base may straddle the cable, as best seen in Figure 4. Two recesses 23 are formed in the top surface of the base and they open into the slot 22 in the bottom portion of the base. The recesses 23 are provided for receiving the lower end of the similar contacts 24 which are assembled in the outlet. A central plate member 25 is on the top of the base and separates the recesses 23. An aperture 26 is arranged in the center of the plate member to receive the tubular rivet or eyelet 27 that fastens the cap or cover member 16 on the base 14. The adjustable ring 15 is substantially of the same diameter as the base 14, the ring having an upper circular flange 30 and lower circular flange 31, as best seen in Figure 5, for mating engagement with the lower circular portion 32 of the cap 16 and the circular wafer 33 on the top of the base respectively. Thus, the ring 15 is sandwiched between the cap 16 and the base 14 and it is capable of rotary motion with respect thereto. The interior surface of the ring is oval shaped as at 34 in Figure 8, and serves as a cam track in engagement with the similar contacts 24. A pair of attachment plug prong-receiving openings 35 are arranged in the cap 16 in alignment with the contacts 24, as is seen in Figures 5 and 6. It should be understood that while the base 14 and the ring 15 are of circular shape, the cap 16 is of oval shape, as best seen in Figure 2, to provide a better hand-hold on the ring. A circular opening 36 in the cap permits the fastening of the outlet parts by the hollow rivet 27 as seen in Figure 5.

The electrical contacts 24 of Figure 3 are of thin strip material and bent into generally a hairpin shape with a short leg 40, a U-bend 41 and a long leg or terminal end 42. The short leg 40 is the portion that engages the prongs of an attachment plug inserted through the openings 35 of the cap. The terminal ends 42 have two distinct features. The first is the loop 43 which engages the edge of the oval cam surface 34 of the ring member 15, as seen in Figures 5 and 6. Hence, the ring serves to support the contacts in the outlet and hold them in their proper position for mating engagement with the cable. The second feature of the terminal end 42 of the contacts is the tongue portion 44 which is inwardly turned toward the similar part of the other contact for engagement with the conductors 12 of the cable 10.

In order to assemble the outlet of my invention to the cable 10, the base 14 of the outlet is placed over the cable, thereby taking the position of Figure 5. In this figure the longest dimension of the oval shaped cam surface 34 would extend across Figure 5; however, in Figure 6 the ring has been turned through 90° so that the short axis or dimension of the oval cam 34 of the ring forces the terminal ends 42 of the contacts toward each other so that the tongues 44 will force their way through the beveled surfaces 18 and into engagement with the conductors 12.

Having described above my invention of a novel extension wiring system comprising a cable and plug-in outlet, it will be understood by those skilled in this art that this outlet is intended for easy attachment and detachment at any point along the cable. If it is intended to locate the outlet at any particular place permanently, a screw may be inserted through the tubular rivet and driven into a supporting wall surface. This invention appears to have been reduced to its minimum number of parts while it is also easy to manufacture its components and to assemble them quickly with the least amount of difficulty.

Modifications of this invention will occur to those skilled in this art and it is to be understood, therefore, that this invention is not limited to the particular embodiment disclosed but that it is intended to cover all modifications which are within the true spirit and scope of this invention.

What I claim as new and desire to secure by Letters Patent of the United States is:

1. An outlet adapted to be mounted over a cable having bare conductors mounted in opposite side grooves thereof, comprising a recessed base with a diagonal slot in its bottom wall so that the base may straddle the cable, a recessed cap fastened over the base to form a hollow housing, a manually adjustable ring member mounted between the base and cap and having an oval-shaped interior cam surface, a pair of electrical contacts arranged in the housing, each contact having an attachment plug prong-engaging portion and a terminal portion for engagement with a conductor of a cable, a pair of plug prong-receiving openings in the cap in alignment with the contacts, the terminal end of each contact being biased against the interior cam surface of the ring so that rotation of the ring will make and break the connection of the contacts of the outlet with the conductors of a cable.

2. An outlet adapted to be mounted over a cable having conductors arranged in grooves in opposite side walls thereof, comprising a recessed base and a cover member forming a hollow housing containing a pair of electrical contacts, each contact comprising an attachment plug prong-engaging portion and a terminal portion for connecting with the cable conductors, the bottom wall of the base being slotted through the center so that the outlet may straddle the cable, a pair of plug prong-receiving openings in the cover in alignment with the contacts, and an adjustable ring member sandwiched between the base and cover and rotatable with respect thereto, the interior of the ring being cam-shaped and in engagement with the terminal ends of the contact for moving the contact terminals toward and away from the cable conductors.

3. The combination of an electrical cable comprising insulation of semi-rigid material supporting a pair of conductors in grooves in the opposite side walls thereof, and an outlet to be clamped anywhere along the length of the cable comprising a recessed base and a recessed cover member forming a hollow housing, the bottom portion of the base being slotted diagonally so that the base may straddle the cable, and a pair of generally hairpin-shaped electrical contacts of strip material mounted in the housing in side-by-side relation, each contact having a short leg comprising an attachment plug prong-engaging portion and a long leg comprising the terminal end, the terminal ends of the contacts being formed inwardly toward each other for cooperation with the cable conductors in the side grooves, a pair of plug prong-receiving openings in the cover in alignment with the contacts, and an adjustable ring member sandwiched between the base and cover with an inner cam surface for engagement with the long leg of each contact so that the outlet may be attached to the cable by turning the ring for moving the terminal ends of the contact into and out of engagement with the cable conductors.

4. A combination as recited in claim 3 wherein the long leg or terminal end of each contact has an arcuate shaped cam follower for mating engagement with the inner cam surface of the ring member so that the ring serves to position the contacts in the outlet.

References Cited in the file of this patent

UNITED STATES PATENTS

| | | |
|---|---|---|
| 434,509 | Huntington | Aug. 19, 1890 |
| 1,751,842 | Propp | Mar. 25, 1930 |
| 2,261,986 | Frank et al. | Nov. 11, 1941 |
| 2,274,798 | Kostal | Mar. 3, 1942 |
| 2,309,972 | Messing | Feb. 2, 1943 |
| 2,437,579 | Wilson | Mar. 9, 1948 |

FOREIGN PATENTS

| | | |
|---|---|---|
| 935,442 | France | Feb. 2, 1948 |